Feb. 8, 1927.
R. W. WOOD
1,616,734
SPRING WHEEL
Filed Jan. 28, 1926
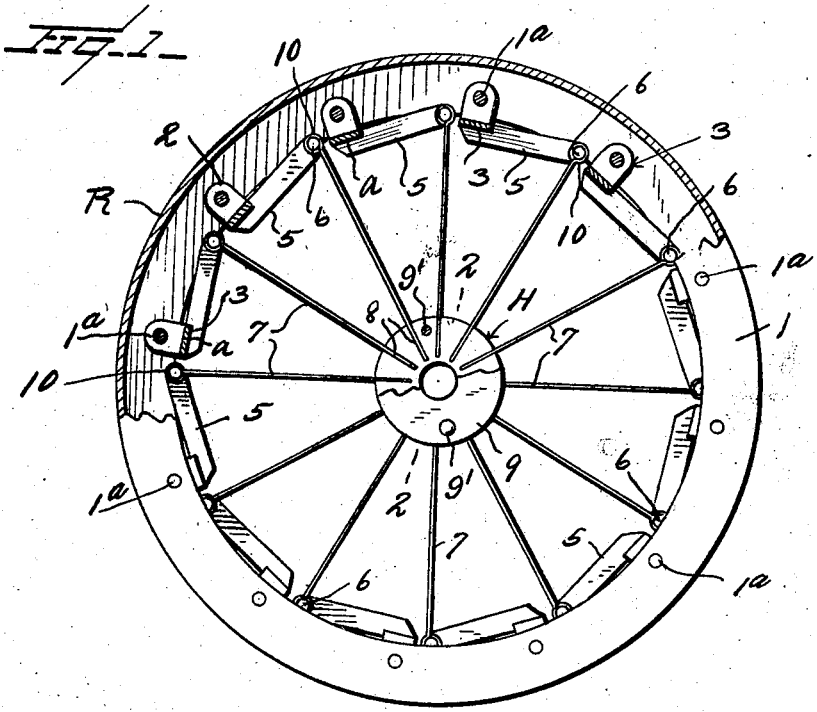
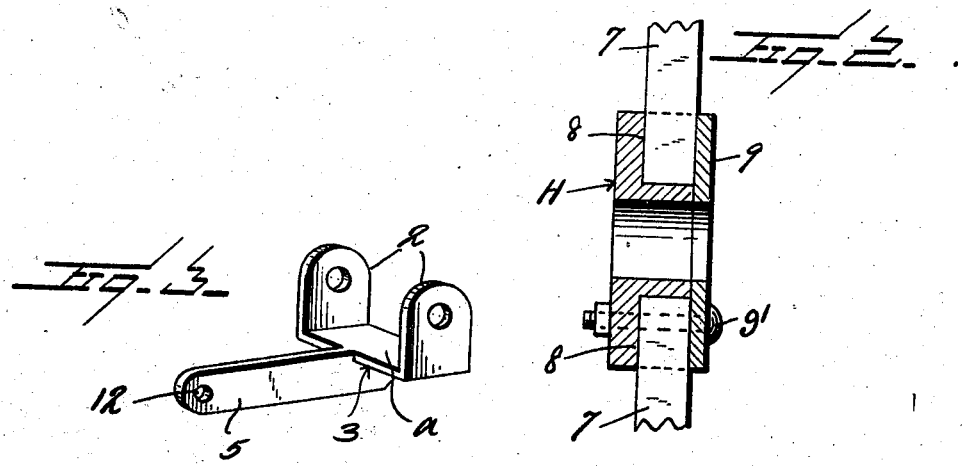
Inventor
R. W. Wood
By Watson E. Coleman
Attorney Patented Feb. 8, 1927.

1,616,734

UNITED STATES PATENT OFFICE.

ROBERT W. WOOD, OF KANSAS CITY, MISSOURI.

SPRING WHEEL.

Application filed January 28, 1926. Serial No. 84,391.

This invention relates to certain improvements in spring wheels and it is an object of the invention to provide a device of this kind constructed in a manner whereby it effectively takes up the shocks and jars incident to travel.

Another object of the invention is to provide a device of this kind comprising a hub and a rim substantially concentric thereto when the wheel is free of load and wherein spring spokes radiate from the hub and are operatively engaged with the rim through the instrumentality of suitably located rock levers.

The invention consists in the details of construction and in the combination and arrangement of the several parts of my improved spring wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in elevation and partly in section illustrating a spring wheel constructed in accordance with an embodiment of my invention;

Figure 2 is an enlarged fragmentary sectional view taken substantially on the line 2—2 of Figure 1;

Figure 3 is a view in perspective of one of the brackets and rock levers herein employed;

Figure 4 is a view partly in section and partly in elevation illustrating the connection between a lever or arm and a spoke.

As disclosed in the accompanying drawings, R denotes the rim of a wheel structure which is of channel form in cross section with the side flanges 1 inwardly disposed. Pivotally supported by the pins 1ª between the flanges 1 at points spaced circumferentially of the rim R are the arms 2 of the substantially U-shaped brackets 3. The intermediate or base portions $a$ of such brackets 3 have extending therefrom in the same general direction the levers or arms 5 of relatively short length.

Hingedly connected, as at 6, to the outer or free end portion of each of the levers or arms 5 is an outer end portion of a spring spoke 7 radiating from and suitably attached to the hub H. The hub H comprises a circular member provided in one side face with a series of radial grooves 8 in each of which is snugly engaged the inner end portion of a spring spoke 7. Overlying the face of the hub H provided with the grooves 8 is a plate 9 held in applied position through the instrumentality of the bolts 9' or the like. This plate 9, when applied, serves to effectively maintain the inner portions of the spokes 7 in proper assembly with respect to the hub H.

The tension of the spokes 7 is such to maintain the rim R substantially concentric to the hub H when the wheel in its entirety is free of load. However, when the wheel is in transit, the spokes 7 and the associated arms or levers 5 will permit such relative movement of the hub H and rim R to effectively compensate for the shocks and jars incident to travel. This is further assured in view of the fact that the spokes 7 are so arranged that each spoke has substantially the same weight in any position of the wheel.

The levers or arms 5 are also resilient or of spring metal so as to operate to advantage to take care of lateral strain on curves or on a graded road.

As herein disclosed, the outer end portion of each of the spokes 7 is provided with a laterally directed barrel 10 having its central portion slotted, as at 11 in Figure 4, to receive the free end portion of the coacting arm or lever 5, the associated pivot member 6 being directed through said barrel 10 and a suitable opening 12 provided in the free end portion of the rock arm or lever 5. The portions of the pivot member 6 within the barrel 10 at opposite sides of a slot 11 have freely mounted thereon the anti-friction sleeves 14.

From the foregoing description it is thought to be obvious that a spring wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A wheel structure comprising a hub, a rim of channel formation with the side flanges inwardly disposed, U-shaped brackets having side arms extending within the channeled rim and pivotally engaged therewith, rock levers extending from said brackets and disposed in the same general direction, spring spokes having their inner end portions secured to the hub, and means for pivotally connecting the outer extremities of the spokes to the outer extremities of the rock levers.

In testimony whereof I hereunto affix my signature.

ROBERT WOOD.